(12) United States Patent
Neff et al.

(10) Patent No.: US 10,975,882 B2
(45) Date of Patent: Apr. 13, 2021

(54) AXIAL FAN WHEEL

(71) Applicant: MAN Truck & Bus AG, München (DE)

(72) Inventors: Andreas Neff, Munich (DE); Christian Gell, Gerolsbach (DE)

(73) Assignee: MAN TRUCK & BUS AG, München (DE)

( * ) Notice: Subject to any disclaimer, the term of this patent is extended or adjusted under 35 U.S.C. 154(b) by 230 days.

(21) Appl. No.: 15/793,070

(22) Filed: Oct. 25, 2017

(65) Prior Publication Data

US 2018/0112675 A1 Apr. 26, 2018

(30) Foreign Application Priority Data

Oct. 26, 2016 (DE) .......................... 102016012801.1

(51) Int. Cl.
*F04D 29/32* (2006.01)
*F04D 19/02* (2006.01)
(Continued)

(52) U.S. Cl.
CPC ....... *F04D 29/329* (2013.01); *B60H 1/00035* (2013.01); *F04D 19/022* (2013.01);
(Continued)

(58) Field of Classification Search
CPC .... F04D 29/329; F04D 29/5833; F04D 29/34; F04D 29/281; F04D 29/32; F04D 29/28;
(Continued)

(56) References Cited

U.S. PATENT DOCUMENTS

D206,695 S * 1/1967 Dickinson ..................... D23/413
3,749,519 A * 7/1973 Ryba ..................... F04D 29/023
416/241 R
(Continued)

FOREIGN PATENT DOCUMENTS

CN 105393439 A 3/2016
DE 1503617 A1 7/1970
(Continued)

OTHER PUBLICATIONS

Extended European Search Report issued in corresponding European application No. 171954928 dated Feb. 26, 2018, 9 pages.
(Continued)

*Primary Examiner* — David Hamaoui
*Assistant Examiner* — Joshua R Beebe
(74) *Attorney, Agent, or Firm* — Weber Rosselli & Cannon LLP (57) ABSTRACT

An axial fan wheel, in particular for the radiator of a motor vehicle engine, is described. The axial fan wheel includes a crown ring having a multiplicity of rotor blades, a hub having an inner ring which is connected or connectable to a drive shaft, and having, for the purpose of torque transmission, connection surfaces along an outer periphery of the hub which are connected to the inner ring and to the crown ring. The hub has through-passages between the inner ring and the outer periphery. At least one element, arranged rotationally fixedly on the axial fan wheel inside the crown ring, is designed to maintain a pressure difference in the axial direction when the axial fan wheel rotates.

9 Claims, 6 Drawing Sheets

(51) Int. Cl.
*B60H 1/00* (2006.01)
*F04D 29/58* (2006.01)
*F04D 25/08* (2006.01)
*F04D 29/28* (2006.01)
*F04D 29/34* (2006.01)

(52) U.S. Cl.
CPC ........ *F04D 29/5833* (2013.01); *F04D 25/082* (2013.01); *F04D 29/281* (2013.01); *F04D 29/34* (2013.01)

(58) Field of Classification Search
CPC ...... F04D 19/022; F04D 25/082; F04D 25/08; B60H 1/00035; B60H 1/3229
See application file for complete search history.

(56) References Cited

U.S. PATENT DOCUMENTS

| | | | | |
|---|---|---|---|---|
| 5,193,981 A * | 3/1993 | Scheidel | ............... | F04D 29/329 |
| | | | | 416/169 A |
| 5,655,882 A * | 8/1997 | Morgan | ................ | F04D 29/329 |
| | | | | 416/204 R |
| 6,073,593 A * | 6/2000 | Nilson | ................. | F04D 25/022 |
| | | | | 123/41.12 |
| 6,200,098 B1 * | 3/2001 | Kennedy | ............... | F04D 29/263 |
| | | | | 416/131 |
| 6,599,085 B2 * | 7/2003 | Nadeau | ................ | F04D 29/326 |
| | | | | 415/119 |
| 2009/0104053 A1 * | 4/2009 | Franz | ................... | F04D 25/082 |
| | | | | 417/354 |
| 2015/0198177 A1 * | 7/2015 | Gabbin | ................ | F04D 19/002 |
| | | | | 416/190 |
| 2016/0146210 A1 | 5/2016 | De Filippis et al. | | |

FOREIGN PATENT DOCUMENTS

| | | | |
|---|---|---|---|
| DE | 1902598 A1 | 2/1971 | |
| DE | 2240011 A1 | 2/1974 | |
| DE | 102006023417 A1 | 11/2007 | |
| DE | 102007037733 A1 * | 2/2008 | .............. F01P 7/042 |
| EP | 0921318 A2 * | 6/1999 | ........... F04D 25/082 |
| EP | 0921318 A2 | 6/1999 | |
| EP | 1519052 B1 * | 1/2007 | ........... F04D 29/329 |
| EP | 1519052 B1 | 1/2007 | |
| EP | 1892421 A2 | 2/2008 | |
| FR | 2815676 A1 | 4/2002 | |
| GB | 1418236 A | 12/1975 | |
| WO | 2008/146154 A2 | 12/2008 | |
| WO | WO-2008146154 A2 * | 12/2008 | ........... F04D 25/082 |
| WO | WO-2016121144 A1 * | 8/2016 | ............... F04D 29/32 |

OTHER PUBLICATIONS

European Office Action issued in corresponding EP Application No. 17195492.8 dated Sep. 30, 2019, 3 pages. No English translation available.

First Office Action issued in Chinese Patent Application No. 201710999923.6 dated May 13, 2020 with English translation, 15 pages.

* cited by examiner

AXIAL FAN WHEEL

BACKGROUND

1. Technical Field

The present disclosure relates to an axial fan wheel. In particular, an axial fan wheel for the radiator of a motor vehicle engine and a utility vehicle equipped therewith are described.

1. Description of Related Art

In order to supply ambient air to the radiator of a cooling circuit, an axial fan wheel for generating a negative pressure at the radiator is arranged for example downstream of the radiator in the flow direction. Depending on ambient-air temperature and cooling power, a fan hub of the axial fan wheel has to transmit considerable mechanical power to the rotor blades of the axial fan wheel, which power can be more than 10 kW in the utility vehicle sector. This gives rise to correspondingly large centrifugal forces in the fan hub and, for the transmission of power and during changes in rotational speed, large shear forces.

Document EP 1 519 052 B1 describes an axial fan wheel whose hub end surface comprises a mechanism with displaceable aperture discs. When the axial fan wheel rotates, the aperture discs close off the hub end surface. When the fan is switched off, the hub end surface is partially opened by way of preload.

However, a mechanism, integrated into the rotating fan hub, with moving parts, in particular with aperture discs which are displaceable in the direction of rotation with respect to the fan hub, hinders efficient operation, in terms of power, of the axial fan wheel. The additional rotating mass of the mechanism leads to an increase in the power consumption of the axial fan wheel and thus for example in the fuel consumption. Also, a mechanism integrated into the fan hub is subjected to the forces mentioned and, in the air stream, can jam due to dirt. It is true that, for the purpose of reducing the rotating mass, it is in principle possible to provide the fan hub with permanent openings. However, as a result of the openings, the negative pressure built up on the radiator side is reduced.

SUMMARY

It is therefore an object of the present disclosure to specify a more energy-efficient axial fan wheel which meets the load requirements for example in the utility vehicle sector.

Said object is achieved by an axial fan wheel and a motor vehicle equipped therewith according to the independent patent claims. Advantageous embodiments and applications form the subject matter of the dependent patent claims and are explained in more detail hereinbelow with partial reference to the figures.

According to one aspect, an axial fan wheel, in particular for the radiator of a motor vehicle engine, is provided. The axial fan wheel comprises a crown ring having a multiplicity of rotor blades; and a hub having an inner ring which is connected or connectable to a drive shaft, and having, for the purpose of torque transmission, connection surfaces along an outer periphery of the hub which are connected to the inner ring and to the crown ring. The hub has through-passages between the inner ring and the outer periphery. At least one element, arranged in a rotationally fixed manner on the axial fan wheel inside the crown ring, is designed to maintain a pressure difference in the axial direction when the axial fan wheel rotates.

The rotor blades can extend radially from the crown ring outside the crown ring. The rotor blades can drive an air stream. The at least one element makes it possible to prevent recirculation (or backflow) of the air stream in the periphery of the hub (for example inside the outer periphery).

Since the at least one element is arranged on the axial fan wheel in a rotationally fixed manner, in particular without relative movement to the hub, exemplary embodiments of the axial fan wheel are able to meet the load and power requirements in the utility vehicle sector. Alternatively or additionally, on account of the through-passages, it is possible, for the purpose of reducing the required driving power, in particular in the case of changing rotational speeds, for the rotating mass of the hub to be reduced.

The at least one element can prevent pressure equalization or pressure reduction of the air via the through-passages. The at least one element may in this case be designed without or without significantly contributing to the rotating mass of the hub, for example since the at least one element is not involved in the transmission of torque (from the inner ring to the crown ring via the connection surfaces).

The connection surfaces along the outer periphery may be realized by an outer ring and/or ring segments along the outer periphery. The outer ring may be circumferentially closed. The ring segments may be spaced apart from one another. The connection surfaces may be situated in a plane of rotation of the axial fan wheel or of the hub.

The outer periphery, for example the outer ring and/or the ring segments, may be arranged radially inside the crown ring. The inner ring may be arranged radially inside the outer periphery. The transmission of torque between the inner ring and the crown ring is able to take place exclusively via the connection surfaces.

The hub may be of lightweight construction, in particular between the inner ring and the outer periphery (for example the outer ring). Alternatively or additionally, it is possible for the inner ring to be situated outside a plane of rotation of the connection surfaces (for example outside a plane of rotation of the outer ring). For example, the hub may bulge or be curved in the direction of the drive shaft, at least at the inner ring as a connection point.

Conventional fan hubs for the fan drive are designed in such a way that the fan hub itself separates the negative-pressure side (or fan suction side) from the positive-pressure side (for example the engine compartment), whereby, due to a wall thickness of the fan hub that is formed for the purpose of the torque transmission, the moment of inertia of said hub is greater than in exemplary embodiments. If the moment of inertia of the fan hub were to be reduced by way of openings, the cooling power, at the same rotational speed, would become poorer, and, to build up the same pressure difference, the rotational speed would have to be increased. By contrast, exemplary embodiments having the element fastened in a rotationally fixed manner on the axial fan wheel are able to prevent air recirculation without significantly increasing the moment of inertia of the axial fan wheel or of the hub thereof. The same pressure difference can thus be generated at the same rotational speed with lower power consumption.

The at least one element may comprise an additional cover plate and/or an air guide device which counteracts the recirculation. The air guide device may comprise further rotor blades inside the periphery of the crown ring. The air guide element may be joined with the hub integrally in one piece (for example by forming the hub without additional mass) or screwed on as an additional sheet. The lightweight construction of the hub with the through-passages allows for example fuel reduction without recirculation of cooling air.

The pressure difference in the axial direction can be built up by the rotating rotor blades, for example radially outside the crown ring. The pressure difference in the axial direction can be maintained by the at least one element radially inside the crown ring.

The inner ring may be connected or connectable to the drive shaft via a press fit. The axial fan wheel may be driven hydrostatically, electrically or mechanically (for example via a belt).

A surface portion, projected into the plane of rotation (that is to say axially), of the hub between the inner ring and the outer periphery (for example outer ring) may be smaller than a surface portion, projected into the plane of rotation (that is to say axially), of the through-passages between the inner ring and the outer periphery (for example outer ring). Alternatively or additionally, a radial width of the through-passages may be greater than a diameter of the inner ring (for example an inner diameter or inscribed-circle diameter) of the inner ring.

The at least one element may cover and/or (at least partially) close off the interior of the crown ring and/or the through-passages between the inner ring and the outer periphery (for example outer ring). The covering or closing ring is also referred to as a cover.

The at least one element may comprise further rotor blades. Further rotor blades may be integrally formed on the at least one element (for example the cover).

The at least one element may comprise spokes for the transmission of torque between the inner ring and the outer periphery (for example outer ring). The spokes may be designed as further rotor blades. The hub may have the through-passages between the spokes.

The further rotor blades, which, for example, are formed by spokes and/or are integrally formed on the cover, may be inclined with respect to a plane of rotation of the axial fan wheel and/or may be curved in the circumferential direction (or direction of rotation). The further rotor blades may include an angle of inclination with the plane of rotation, or may have a slope. The angle of inclination may be (for example on the outer periphery or on the periphery of the outer ring) at least 5° to 15°.

The at least one element may be arranged rigidly on the hub. The at least one element may be immovable with respect to the hub (in particular fixed in terms of rotation and pivoting with respect to the hub) during operation of the axial fan wheel. For example, a position of the at least one element with respect to the hub may be independent of rotational speed.

The at least one element may be manufactured from a light metal (for example aluminium) or from a fibre-composite material (for example with glass or carbon fibres). The at least one element, for example the cover, may be thin-walled. For example, an axial wall thickness of the cover may be less than an axial wall thickness of the hub. The at least one element, for example the cover, may be manufactured from aluminium sheet.

The at least one element, for example the cover, may be without contribution to the transmission of torque (in particular without contributing to the transmission of driving torque from the drive shaft) to the crown ring.

A diameter of the at least one element may be greater than an outer diameter of the outer periphery (for example of the outer ring). The diameter of the at least one element may be (at least substantially) equal to or less than an inner diameter of the crown ring.

The at least one element may be arranged offset with respect to the hub in the axial direction. Alternatively or additionally, the inner ring may be arranged outside a plane of rotation defined by the connection surfaces or the outer ring. For example, the cover may be arranged on an upstream side of the plane of rotation defined by the connection surfaces or the outer ring. The inner ring may be arranged on a downstream side of the plane of rotation defined by the connection surfaces or the outer ring.

According to a further aspect, a motor vehicle, in particular a utility vehicle, is provided. The motor vehicle comprises a fan arrangement having an axial fan wheel according to an embodiment of the above-mentioned aspect. The fan arrangement may comprise a radiator for cooling an assembly of the drive train, for example an internal combustion engine and/or an electrical traction energy storage device.

BRIEF DESCRIPTION OF THE FIGURES

Further features and advantages of the disclosure are described hereinbelow with reference to the appended drawings, in which.

DETAILED DESCRIPTION

Figure 1:
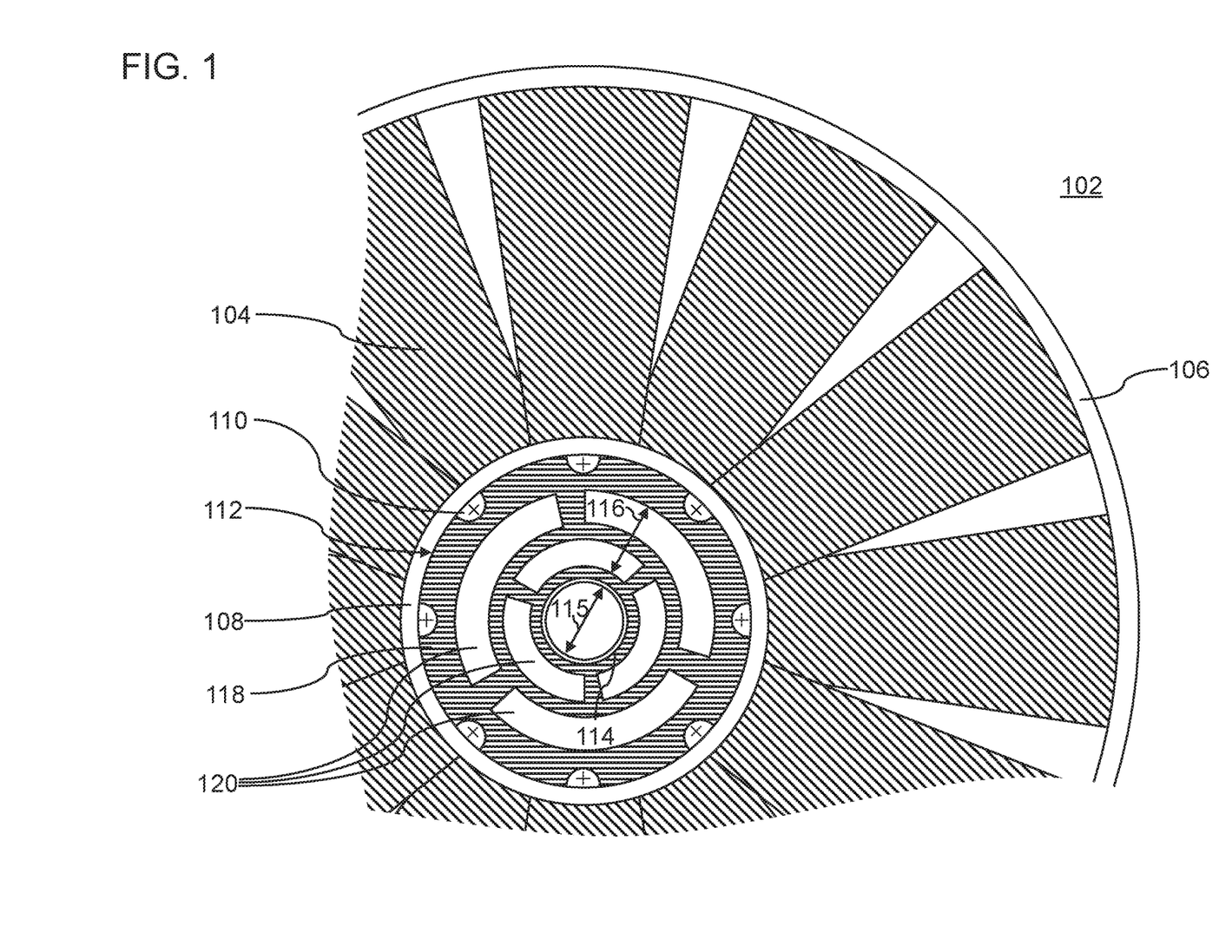
FIG. 1 shows a diagrammatic view of a first exemplary embodiment of a hub for an axial fan wheel.

FIG. 1 shows a first exemplary embodiment of an axial fan wheel which is generally identified by the reference sign 102. The axial fan wheel comprises a multiplicity of rotor blades 104 which are bounded radially on the outside by a casing ring 106 and radially on the inside by a crown ring 108. On the crown ring 108, it is possible for crown webs 110 to project radially to the inside, with fastening points for the rotationally fixed connection (for example screwed connection) to a hub 112.

The hub 112 comprises an inner ring 114 which is connectable to a drive shaft, and connection surfaces on an outer periphery 118 of the hub 112, for example an outer ring or segments of such a ring. The hub 112 is connected to the crown ring 108 via the connection surfaces, for example via the outer ring.

For clarity of the description, it is assumed in the following description that the connection surfaces are formed along the outer periphery by an outer ring 118. Wherever the following text is geared towards the outer ring 118, this may be modified such that only segments of the described outer ring 118 are present and form the connection surfaces.

Torque (for example a driving torque and/or a deceleration torque of the axial fan wheel 102) is transmissible via a region 116 between the inner ring 114 and the outer ring 118. The intermediate region 116 comprises a multiplicity of through-passages 120.

The intermediate region 116 is of lightweight construction because of the through-passages 120. For example, the mass and/or the moment of inertia of the intermediate region 116 is minimized under the constraint of the transmission of the torque between the inner ring 114 and the outer ring 118 of the hub 112.

In the exemplary embodiment shown in FIG. 1, the intermediate region 116 comprises at least one ring which, for the purpose of transmitting the torque, is connected, via radial webs, on the inside to the inner ring 114 and on the outside to the outer ring 118. The inner radial webs and the outer radial webs are circumferentially distributed in a uniform manner, that is to say with equal angular spacings. For example, three inner radial webs include in each case in pairs an angle of 120°. Likewise, three outer radial webs include in each case in pairs an angle of 120°. In this case, outer and inner webs are not arranged in radial alignment. For example, in the case of three inner radial webs and three outer radial webs, each inner radial web includes an angle of 60° with an outer radial web. With double the number of webs, the corresponding angle is half as large.

Figure 2:
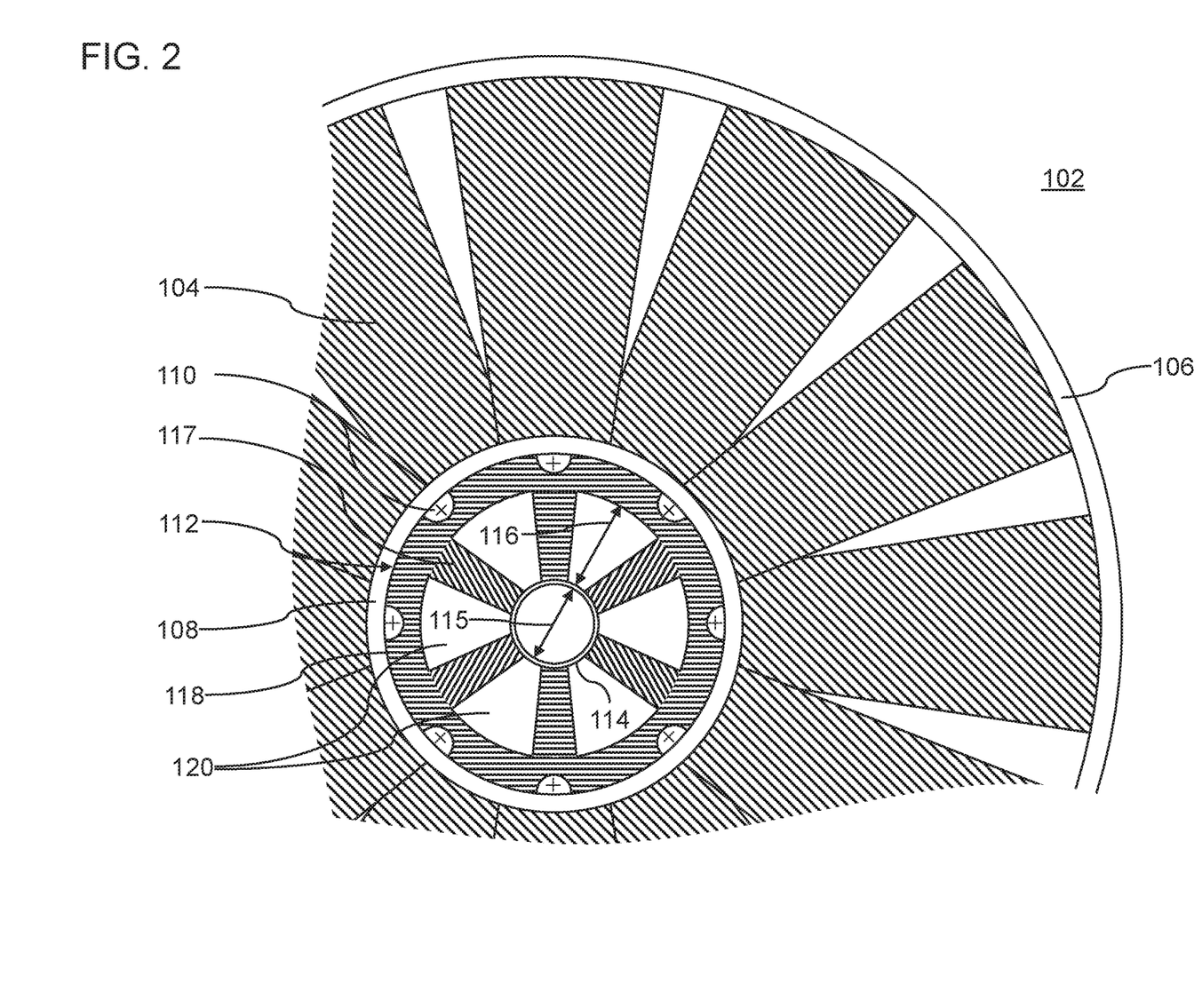
FIG. 2 shows a diagrammatic view of a second exemplary embodiment of a hub for an axial fan wheel.

FIG. 2 shows a second exemplary embodiment of a hub 112 for an axial fan wheel 102. Identical or functionally corresponding features are designated by corresponding reference signs in the figures.

The second exemplary embodiment of the hub 112 shown in FIG. 2 comprises, in the intermediate region 116, a multiplicity of spokes 117 which each extend radially from the inner ring 114 to the outer ring 118. The through-passages 120 of the hub 112 are between the spokes 117.

In each exemplary embodiment of the hub 112, its lightweight construction can be achieved by a surface portion of the hub 112 in the intermediate region 116, which portion is smaller than a surface portion of the through-passages 120. For example, in the intermediate region 116 between the inner ring 114 and the outer ring 118, the portion, projected onto the plane of rotation in the axial direction, of the hub 112 (that is to say the closed surface portion of the intermediate region 116) is smaller than the correspondingly projected portion of the through-passages 120.

Alternatively or additionally, a radial width of the intermediate region 116 (for example the length of the spokes 117) is greater than a diameter 115 of the inner ring 114.

The axial fan wheel 102 further comprises (for example in combination with each above-mentioned exemplary embodiment of the hub 112) an element which is arranged in a rotationally fixed manner on the axial fan wheel 102 inside the crown ring 108 and which is designed to maintain a pressure difference in the axial direction when the axial fan wheel 102 rotates. The at least one element maintains the pressure difference, for example in that the through-passages 120 are closed off or covered. Alternatively or additionally, on account of the rotation of the hub 112, the at least one element locally generates a pressure difference, which corresponds to the pressure difference that is to be maintained.

Advantageously, the at least one element does not or does not significantly contribute to the mass or the moment of inertia of the hub 112 or of the axial fan wheel 102. For example, the at least one element comprises a thin-walled cover which prevents air recirculation (or partial backflow) through the through-passages 120. Alternatively or additionally, the at least one element comprises further rotor blades which are integrally formed on a cover of the through-passages 120 or which are simultaneously part of the torque-transmitting structure in the intermediate region 116.

Figure 3:
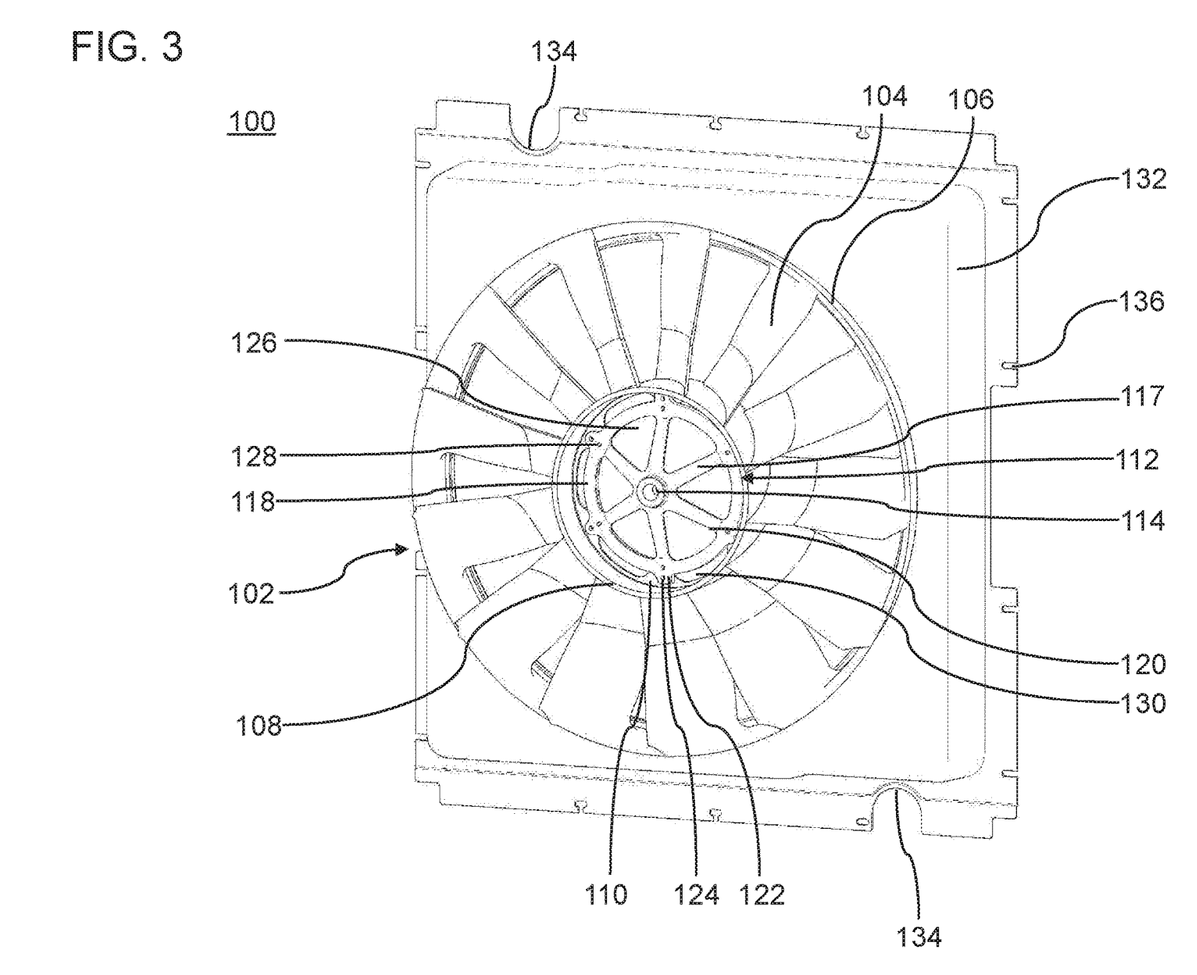
FIG. 3 shows a perspective illustration of a fan arrangement with a first exemplary embodiment of an axial fan wheel.

FIG. 3 shows a first exemplary embodiment of the axial fan wheel 102 in the context of an exemplary fan arrangement 100. The hub 112 of the axial fan wheel 102 may comprise alternative or additional features according to each of the examples of the hub 112 that are described with reference to FIGS. 1 and 2.

Optionally, the outer ring 118 of the hub 112 comprises hub webs 122, projecting radially from the outer ring 118, having fastening openings 124, by way of which the hub 112 is connected in a rotationally fixed manner to the crown ring 108 (for example on the crown webs 110).

On the outer ring 118, a cover 126 is arranged on the upstream side of the hub 112 (that is to say on the rear side of the view in FIG. 3) as the element maintaining the pressure difference. The cover 126 comprises a circular-disc surface or a conical surface whose tip is situated in the extension of the axis of the hub 112. An outer diameter of the cover 126 corresponds substantially to an inner diameter of the crown ring 108, and so the interior of the crown ring 108 is closed off against air recirculation by the cover 126.

The cover 126 is fastened circumferentially at a multiplicity of fastening openings 128 in the outer ring 118. Since the bearing structure of the hub 112, in particular for transmitting the torque, is formed by the inner ring 114, the intermediate region 116 (for example the spokes 117 shown in FIG. 3) and the outer ring 118, the cover 126 is not subjected to any transmission of force or transmission of torque to the rotor blades 104 of the axial fan wheel 102. Accordingly, the cover 126 may be thin-walled without any significant contribution to the mass and to the moment of inertia of the hub 112 or of the axial fan wheel 102. Preferably, the cover 126 is manufactured from aluminium sheet.

For example, the cover 126 may also close off an opening 130 between the outer ring 118 and the crown ring 108, which opening comes into being due to the hub webs 122 that extend radially outward from the outer ring 118.

The exemplary fan arrangement 100 shown in FIG. 3 comprises the axial fan wheel 102 and a radiator which is arranged upstream on the negative-pressure side of the axial fan wheel 102. For the sake of clarity, only a radiator trough 132 of the radiator is shown in FIG. 3. The radiator trough 132 comprises at least two cut-outs 134 for a cooling-water circuit running in the axial direction, and slots 136 for mounting the radiator trough 132, for example in a motor vehicle.

Figure 4:
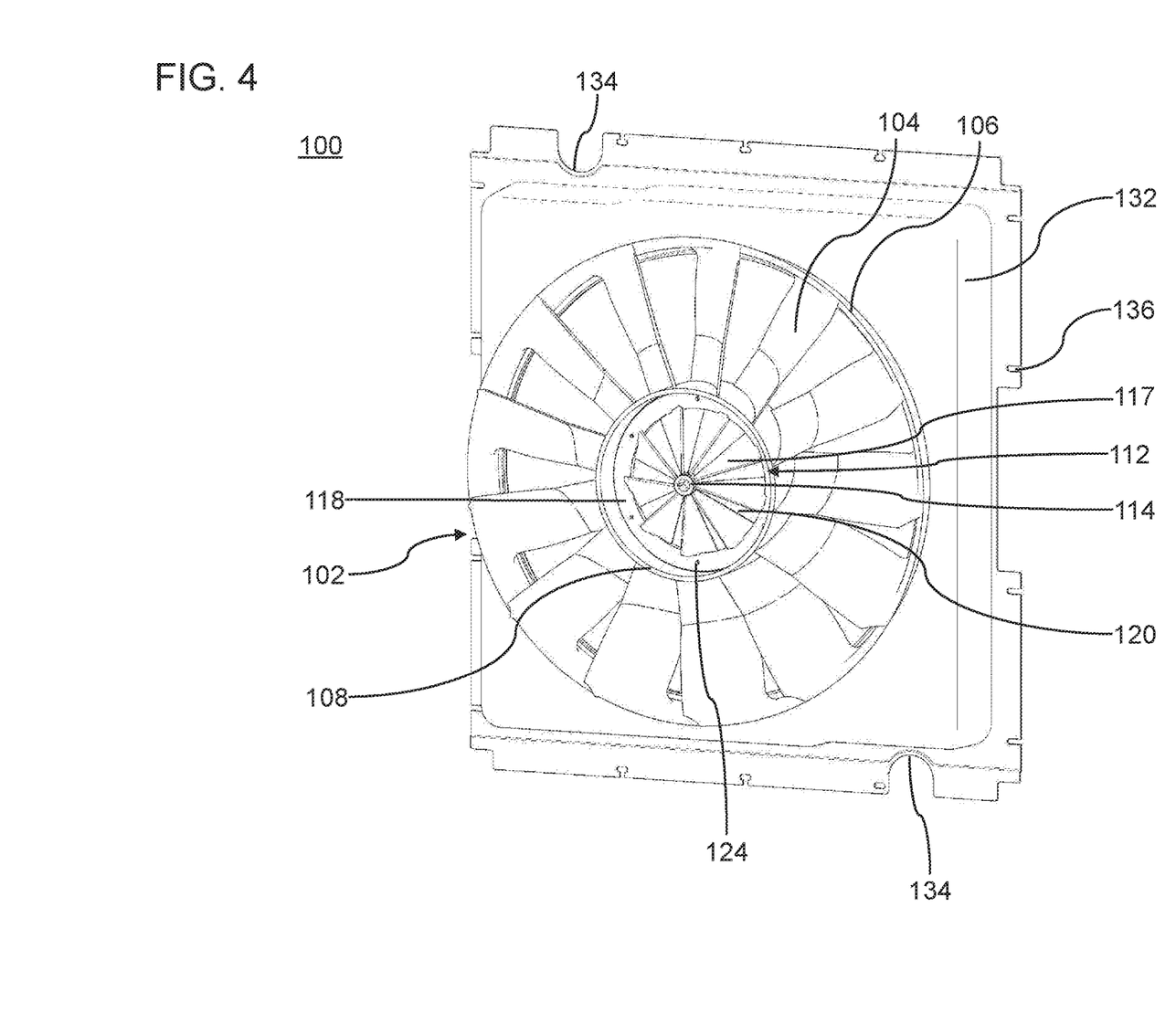
FIG. 4 shows a perspective illustration of a fan arrangement with a second exemplary embodiment of an axial fan wheel.

FIG. 4 shows a second exemplary embodiment of the axial fan wheel 102 in the context of an exemplary fan arrangement 100. Features which correspond to or are interchangeable with (in a structural or functional sense) those of FIGS. 1 to 3 are provided with identical reference signs.

In the second exemplary embodiment of the axial fan wheel 102 shown in FIG. 4, the spokes 117 between the inner ring 114 and the outer ring 118 are designed as further rotor blades. These further rotor blades are an example of the element maintaining the pressure difference.

For example, the spokes 117 comprise sections of a triangular surface which is inclined at an angle of inclination to the plane of rotation. Alternatively, the spokes 117 comprise a curved surface, for example a section of a hyperbolic paraboloid, wherein the two edges of each spoke 117 are not parallel to the plane of rotation of the axial fan wheel 102.

In the second exemplary embodiment shown in FIG. 4, the two edges of each spoke 117 are skewed straight lines.

In the second exemplary embodiment of the axial fan wheel 102, the cover 126 may be omitted. Preferably, the fastening openings 124 are introduced directly in the outer ring 118 of the hub 112 (for example without projecting hub webs 122), such that the outer ring 118 bears against the crown ring 108 (for example without an opening 130 between the outer ring 118 and the crown ring 108).

Figure 5A:
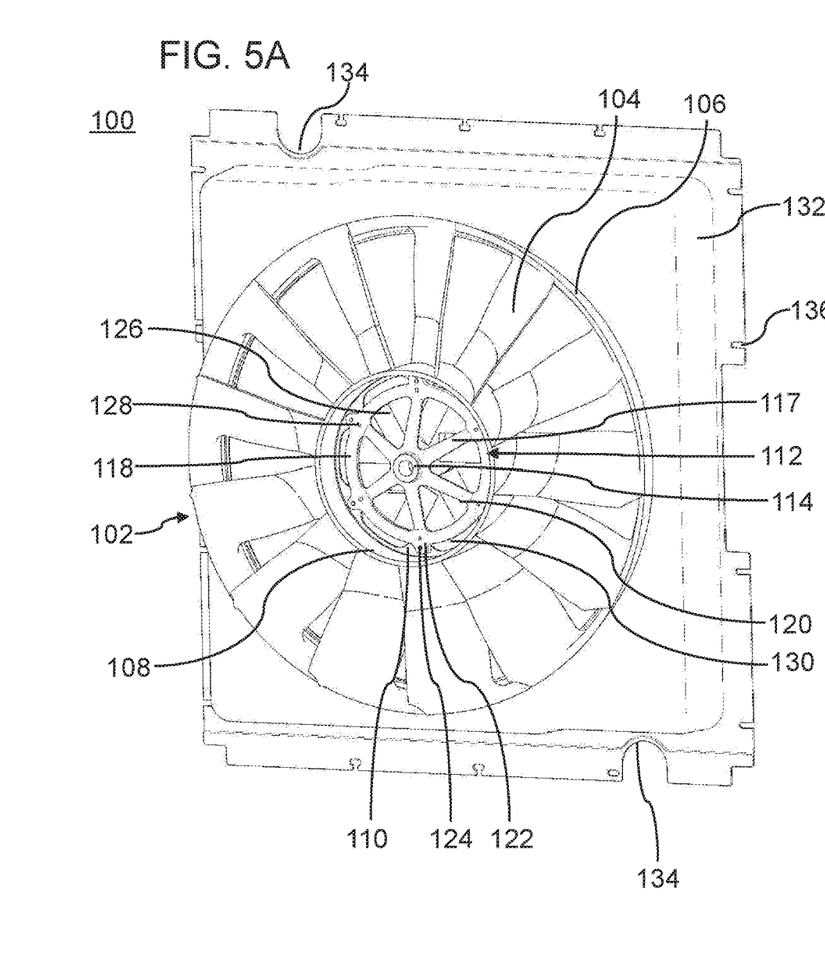
FIGS. 5A and 5B show perspective illustrations of a fan arrangement with a third exemplary embodiment of an axial fan wheel.
Figure 5B:
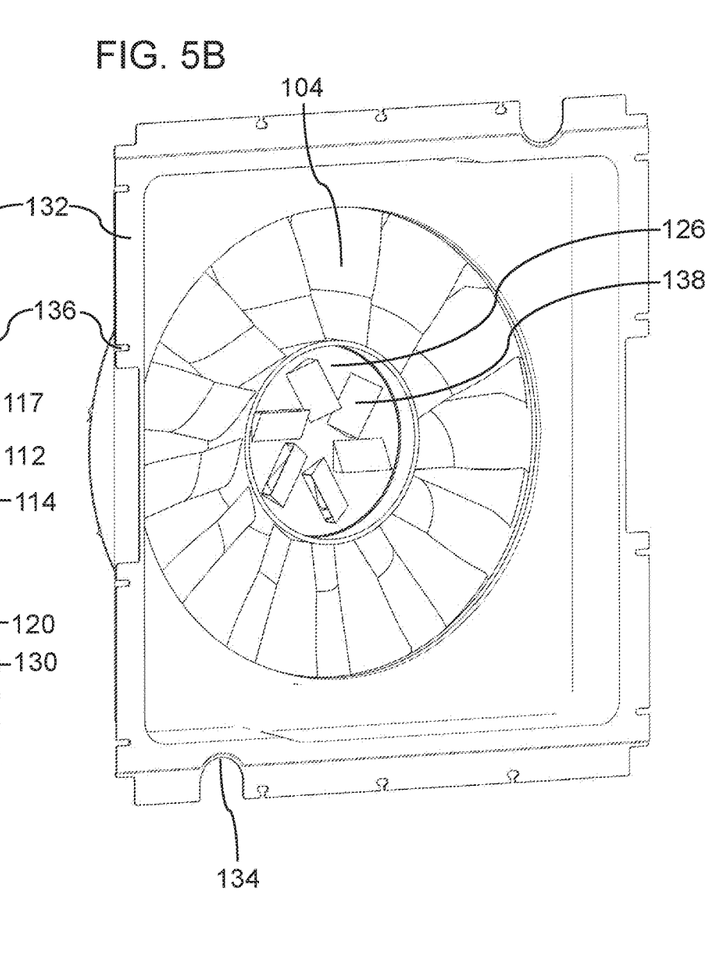

FIGS. 5A and 5B schematically show a front view and a rear view, respectively, of a third exemplary embodiment of the axial fan wheel 102 in the context of an exemplary fan arrangement 100.

The third exemplary embodiment may be described as a variant of the first exemplary embodiment. Identical or functionally corresponding features are provided with identical reference signs as in the first exemplary embodiment of FIG. 3.

The cover 126 comprises a base surface that is planar and parallel to the plane of rotation. On the upstream side (that is to say on the negative-pressure side), further rotor blades 138 project from the base surface in the axial direction. Each of the further rotor blades 138 comprises an inlet side which is open in the direction of rotation and which is fluidically connected to the downstream side of the hub 112 (that is to say to the positive-pressure side of the axial fan wheel 102) by way of an opening, covered by the respective rotor blade 138, in the base surface.

The development of the first exemplary embodiment according to the third exemplary embodiment not only allows the air recirculation through the through-passages 120 to be prevented, but an additional contribution to the air transport through the hub 112 can supplement the main air transport through the rotor blades 104. Also, in particular the second and the third exemplary embodiment are combinable. For example, the cover 126 that is provided with further rotor blades 138 is able to be screwed, on the upstream side, to the hub 112, the spokes 117 of which are designed as further rotor blades.

Figure 6:
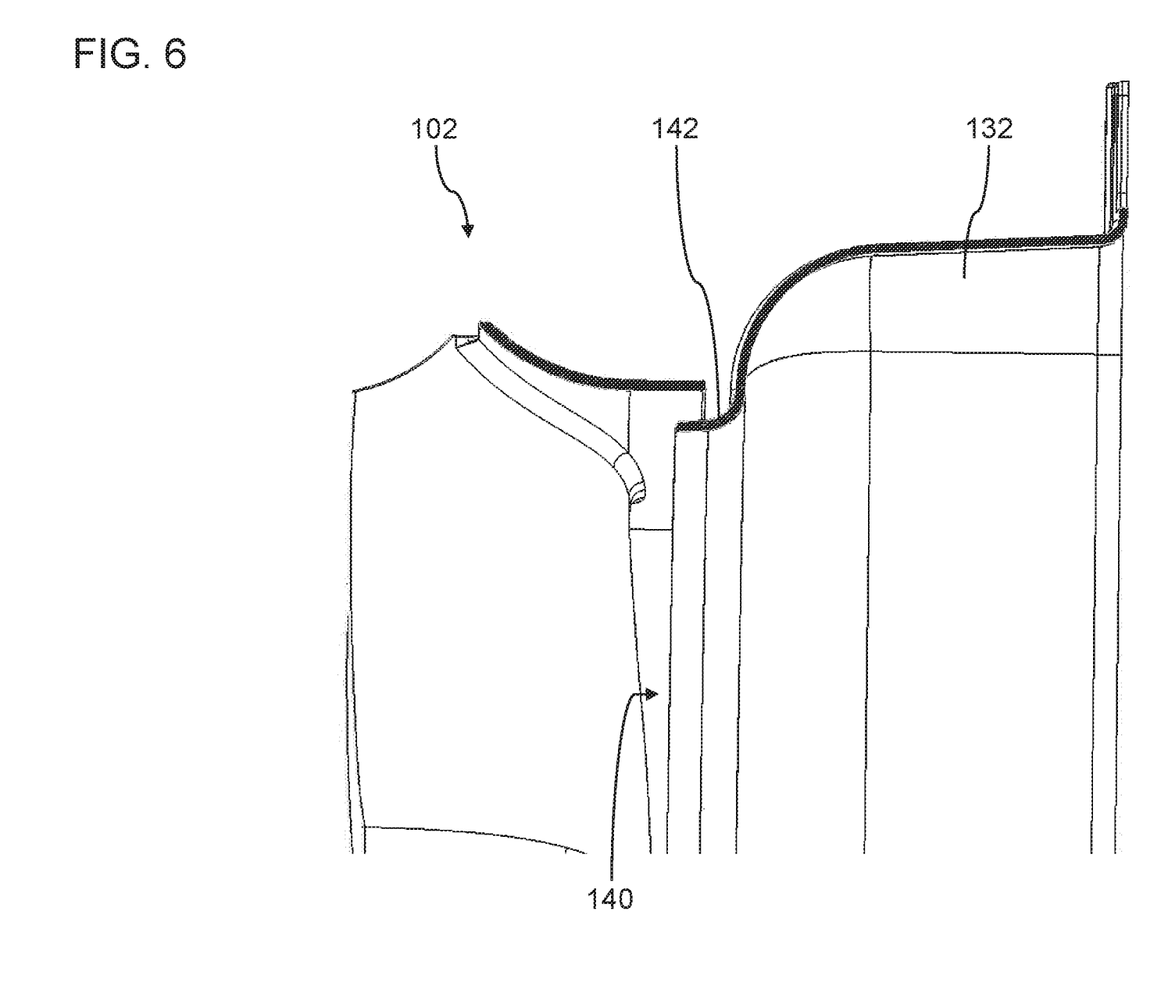
FIG. 6 shows a schematic sectional illustration of an exemplary embodiment of the fan arrangement with axial fan wheel and radiator trough.

FIG. 6 shows a refinement of the radiator trough 132 and of the casing ring 106, which refinement is combinable with each exemplary embodiment described above. At a radiator-side opening 140 of the radiator trough 132, a collar 142 surrounding the opening 140 is formed. A circle diameter of the collar 142 is less, for example less by less than 5%, than a circle diameter of the radiator-side casing ring 106. The casing ring 106 and the collar 142 are arranged in an overlapping manner in the axial direction (that is to say in the horizontal direction in FIG. 6) such that, between the rotating casing ring 106 and the stationary collar 142, a narrow air gap prevents the air recirculation at the edge region of the fan arrangement 100.

Even though the disclosure has been described with reference to particular exemplary embodiments, it is evident to a person skilled in the art that various modifications may be made, and equivalents may be used as a substitute. Furthermore, numerous modifications may be made in order to adapt a particular situation or a particular material to the teaching of the disclosure. Consequently, the disclosure is not limited to the exemplary embodiments disclosed, but rather encompasses all exemplary embodiments which fall within the scope of the appended patent claims.

LIST OF REFERENCE SIGNS

100 Fan arrangement
102 Axial fan wheel
104 Rotor blades
106 Casing ring
108 Crown ring
110 Crown web
112 Hub
114 Inner ring of the hub
115 Diameter of the inner ring
116 Intermediate region of the hub
117 Hub spokes
118 Outer periphery or outer ring of the hub
120 Through-passage in hub
122 Hub web
124 Fastening opening in hub for crown ring
126 Cover
128 Fastening opening in outer ring for cover
130 Openings between outer ring and crown ring
132 Radiator trough
134 Cut-outs for cooling-water circuit
136 Slot
138 Rotor blades in cover
140 Radiator-side opening of the radiator trough
142 Collar of the radiator trough

What is claimed:

1. An axial fan wheel, comprising:
   a crown ring having a plurality of rotor blades;
   a hub having an inner ring connectable to a drive shaft, having, for the purpose of torque transmission, connection surfaces along an outer periphery of the hub which are connected to the inner ring and to the crown ring, wherein the hub has through-passages between the inner ring and the outer periphery; and
   at least one element including a first sub-element and a second sub-element, wherein the first sub-element includes a cover for the through passages, wherein the cover is arranged in a rotationally fixed manner on the axial fan wheel inside the crown ring and is designed to maintain a pressure difference in the axial direction when the axial fan wheel rotates,
   wherein further rotor blades are integrally formed on the cover,
   wherein the second sub-element comprises spokes for the transmission of torque between the inner ring and the outer periphery,
   wherein the hub has the through-passages between the spokes, wherein the through-passages are open when the axial fan wheel rotates,
   wherein a surface portion, projecting into a plane of rotation, of the hub between the inner ring and the outer periphery is smaller than a surface portion, projected into the plane of rotation, of the through-passages between the inner ring and the outer periphery, and
   wherein a diameter of the cover is equal to or less than an inner diameter of the crown ring.

2. The axial fan wheel according to claim 1, wherein a radial width of the through-passages is greater than a diameter of the inner ring.

3. The axial fan wheel according to claim 1, wherein the cover is arranged rigidly on the hub.

4. The axial fan wheel according to claim 1, wherein the at least one element is manufactured from aluminium sheet.

5. The axial fan wheel according to claim 1, wherein the second sub-element does not directly transmit any torque to the crown ring.

6. The axial fan wheel according to claim 1, wherein the second sub-element is arranged offset with respect to the hub in the axial direction.

7. The axial fan according to claim 1, wherein the inner ring is arranged outside a plane of rotation defined by the connection surfaces.

8. The axial fan according to claim 1, wherein the axial fan is used in conjunction with a radiator of a motor vehicle engine.

9. An axial fan wheel, comprising:
a crown ring having a plurality of rotor blades;
a hub having an inner ring connectable to a drive shaft, having, for the purpose of torque transmission, connection surfaces along an outer periphery of the hub which are connected to the inner ring and to the crown ring, wherein the hub has through-passages between the inner ring and the outer periphery; and
at least one element including a first sub-element and a second sub-element, wherein the first sub-element includes a cover for the through passages, wherein the cover is arranged in a rotationally fixed manner on the axial fan wheel inside the crown ring and is designed to maintain a pressure difference in the axial direction when the axial fan wheel rotates,
wherein the second sub-element comprises spokes for the transmission of torque between the inner ring and the outer periphery,
wherein the spokes are designed as further rotor blades,
wherein the hub has the through-passages between the spokes, wherein the through-passages are open when the axial fan wheel rotates,
wherein a surface portion, projecting into a plane of rotation, of the hub between the inner ring and the outer periphery is smaller than a surface portion, projected into the plane of rotation, of the through-passages between the inner ring and the outer periphery, and
wherein a diameter of the cover is equal to or less than an inner diameter of the crown ring.

* * * * *